US005994711A

United States Patent [19]

Seachman et al.

[11] Patent Number: 5,994,711

[45] Date of Patent: Nov. 30, 1999

[54] COPY SUBSTRATE EDGE ELECTRONIC REGISTRATION SYSTEM FOR A REPROGRAPHIC SYSTEM

[75] Inventors: Ned J. Seachman, Penfield; Joseph P. Taillie, Pittsford; Kevin M. Carolan, Webster; Leroy A. Baldwin, Rochester; Robert Brutovski, Penfield; Alain E. Perregaux, Rochester; John D. Hower, Jr., Fairport, all of N.Y.

[73] Assignee: Xerox Corporation, Stamford, Conn.

[21] Appl. No.: 09/141,455

[22] Filed: Aug. 27, 1998

Related U.S. Application Data

[60] Provisional application No. 60/063,202, Oct. 21, 1997.

[51] Int. Cl.[6] ........ G01N 21/86

[52] U.S. Cl. ........ 250/559.36

[58] Field of Search ........ 356/394, 384–386, 356/375; 250/559.36, 559.29, 559.12

[56] References Cited

U.S. PATENT DOCUMENTS

| | | | |
|---|---|---|---|
| 3,781,115 | 12/1973 | Rader et al. | 356/386 |
| 4,067,652 | 1/1978 | Bohlander | 356/386 |
| 4,559,451 | 12/1985 | Curl | 250/559.36 |
| 4,559,452 | 12/1985 | Igaki et al. | 250/559.36 |
| 5,107,131 | 4/1992 | Okada et al. | 250/559.36 |
| 5,166,532 | 11/1992 | Brunner et al. | 250/559.36 |
| 5,220,177 | 6/1993 | Harris | 250/559.36 |

FOREIGN PATENT DOCUMENTS

| | | | |
|---|---|---|---|
| 60-073403 | 4/1985 | Japan | 250/559.36 |

*Primary Examiner*—Hoa Q. Pham
*Attorney, Agent, or Firm*—Michael J. Nickerson

[57] ABSTRACT

A system and method electronically determines an edge of a copy substrate to be printed on. A copy substrate is inserted between a linear light source array and a linear sensor array and a light segment of the linear light source array is illuminated. An edge location of a shadow created by the copy substrate intersecting a light path between the illuminated light segment and the linear sensor array is measured, and a location of the edge of the copy substrate is calculated based on the measured shadow location. A second light segment of the linear light source on an opposite side of an expected copy substrate edge position of the light segment can also be illuminated, and a second edge location of a shadow created by the copy substrate intersecting a light path between the illuminated second light segment and the linear sensor array can be measured wherein this second measurement can be used with the first to calculate a location of the edge of the copy substrate. Alternatively, the calculated location can be used to determine a light segment of the linear light source which corresponds to the calculated location. This determined light source is illuminated and the shadow measured. The new measurement is used to calculate the edge of the copy substrate.

3 Claims, 6 Drawing Sheets

COPY SUBSTRATE EDGE ELECTRONIC REGISTRATION SYSTEM FOR A REPROGRAPHIC SYSTEM

This patent application claims priority under 35 U.S.C. § 119 to provisional patent application number 60/063,202, filed on Oct. 21, 1997.

FIELD OF THE PRESENT INVENTION

The present invention is directed to an reprographic system. More specifically, the present invention is directed to a system for electronically locating a copy substrate's edge so as to provide front to back registration which is particularly useful in a duplex mode.

BACKGROUND OF THE PRESENT INVENTION

A conventional reprographic system is the office copier. Traditionally, the copier, in the office equipment context, refers to a light lens xerographic copier in which paper originals are in fact photographed. The images are focused on an area of a photoreceptor, which is subsequently developed with toner. The developed image on the photoreceptor is then transferred to a copy sheet which in turn is used to create a permanent copy of the original.

In recent years, however, there has been made available what is known as digital copiers. In the most basic functions, a digital copier performs the same functions as a light lens copier, except that the original image to be copied is not directly focused on a photoreceptor. Instead, with a digital copier, the original image is scanned by a device generally known as a raster input scanner (RIS) which is typically in the form of the linear array of small photosensors.

The original image is focused on the photosensors in the RIS. The photosensors convert the various light and dark areas of the original image to a set of digital signals. These digital signals are temporarily retained in a memory and then eventually used to operate a digital printing apparatus when it is desired to print copies of the original. The digital signals may also be sent directly to the printing device without being stored in a memory.

The digital printing apparatus can be any known type of printing system responsive to digital data, such as a modulating scanning laser which discharges image wide portions of a photoreceptor, or an ink jet printhead.

Moreover, with the advent of the digitalization of the office copier, there has also been made available digital multi-function machines. The digital multi-function machine is a single machine which provides a user with more than one function. An example of a typical multi-function machine would include a digital facsimile function, a digital printing function, and a digital copy function.

More specifically, a user can utilize this digital multi-function machine to send a facsimile of an original document to a remote receiving device, to scan in an original image and print copies thereof, and/or to print documents from either a network source, locally connected source, or from a portable memory device which has been inserted into the multi-function machine.

An example of the basic architecture of a digital multi-function machine is illustrated in FIG. 2. As illustrated in FIG. 2, the architecture of the digital multi-function machine includes a scanner 3 which converts an original image into a set of digital signals that can be either stored or reproduced. The scanner 3 is connected to a central bus system 1 which may be either a single bus or a plurality of buses which provide interconnections and intercommunications between the various modules and devices on a multi-function digital machine.

The digital multi-function machine, as illustrated in FIG. 2, further includes a digital printing device 23 which converts digital signals representing an image into a hardcopy of that image on a recording medium whether the recording medium be paper, transparency, or other type of markable medium The digital multi-function machine also includes a memory 21 for storing a variety of types of digital information such as machine fault information, machine history information, digital images to be processed at a later time, instruction sets for the machine, job instruction sets, etc.

In addition to the memory 21, a typical digital multi-function machine includes an electronic pre-collation memory section 7 which may store the digital representation of the image being presently rendered by the digital printing device 23. In the electronic pre-collation memory 7, the digital image is already laid out in its page structure so that it can be readily rendered by the digital printing device 23.

The digital multi-function machine as illustrated in FIG. 2, further includes a user interface 5 which allows the user to select the various functions of the multi-function machine, program various job attributes for the particularly selected function, provide other input to the multi-function machine as well as display informational data from the digital multi-function machine.

If the digital multi-function machine is connected to a network, the digital multi-function machine would include a network interface 19 and an electronic subsystem (ESS) controller 9 which would control the interrelationship between the various modules or devices on the digital multi-function machine and the network.

To enable a facsimile function, the digital multi-function machine would include, typically, a voice/data modem 11 and a telephone circuit board 13. Moreover, the digital multi-function machine may include input/output drives 17 such as a floppy disc drive, a CD ROM drive, a tape drive, or other type of drive which can accept a portable memory device.

In some digital multi-function machines, the machine also includes a finisher 29 which can perform certain operations upon the printed output from the printing device 23. Lastly, the digital multi-function machine includes a controller 15 which controls all the functions within the multi-function device so as to coordinate all the interactions between the various modules and devices.

FIG. 1 illustrates an overall construction of a digital multi-function machine. The digital multi-function machine, as illustrated in FIG. 1, includes a scanning station 35, a printing station 55, and a user interface 50. The digital multi-function machine may also include a finisher device 45 which may be a sorter, tower mailbox, stapler, etc. The printing station 55 may include a plurality of paper trays 40 that store the paper used in the printing process. Lastly, the digital multi-function machine may include a high capacity feeder 30 which is capable of holding large amounts of paper stock to be used by the machine.

In a typical scanning function, the operator would utilize the scanning station 35 to scan in the images from the original documents. This scanning station 35 may be a platen type scanner or may include a constant velocity transport system which moves the original documents across a stationary scanning device. Moreover, the scanning station 35 may also include a document handling system which is capable of placing the original documents, automatically, on the glass platen for scanning.

With respect to the printing functions, the printing station 55 would retrieve the proper paper from one of the multiple paper trays or the high capacity feeder, render the desired image on the retrieved paper, and output the printed image to the finishing device 45 for further operations.

The user interface 50 allows the user to control the various functions of the digital multi-function machine by presenting various types of screens to the user which provides the user an opportunity to program certain job characteristics or function characteristics.

One important function of a digital reprographic system, whether the system be a digital multi-function machine or digital copier, is locating the position of top edge or leading edge a copy substrate to be printed on. This is important in providing proper registration of the image onto the copy substrate. The locating of the top edge or leading edge of the copy substrate to be printed on is particularly important when printing in a duplex mode so as to ensure proper front to back registration on the copy substrate since the duplex path is usually longer than the simplex path. However, the locating of the top edge or leading edge of the copy substrate is equally important in a simplex path because of the many things that can affect the transportation of the copy substrate from its copy output tray to an image transfer station. There have been attempts to provide a means to locate the position of top edge or leading edge a copy substrate to be printed on; however, these attempts have failed to provide the proper registration that is needed to accurately print the image on the copy substrate.

SUMMARY OF THE PRESENT INVENTION

One aspect of the present invention is a method for electronically determining an edge of a copy substrate to be printed on. The method inserts a copy substrate between a linear light source and a linear sensor array; illuminates a light segment of the linear light source; measures an edge location of a shadow created by the copy substrate intersecting a light path between the illuminated light segment and the linear sensor array; and calculates a location of the edge of the copy substrate based on the measured shadow location.

Further objects and advantages of the present invention will become apparent from the following descriptions of the various features of the present invention.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PRESENT INVENTION

The following will be a detailed description of the drawings illustrating the present invention. Like reference numbers in the specification and drawings correspond to like or equivalent circuits, etc.

In the description below, the phrase "copy substrate" is used to denote any recording medium that will receive a printed image thereon and cast a measurable shadow. Moreover, the phrases "leading edge" and "top edge" are used to describe the edge that needs to be determined for proper registration. This edge in question may vary from system to system.

As noted above, an important function of a digital reprographic system is the locating of the leading edge or top edge of the copy substrate for registration purposes. The present invention provides a vehicle to locate the leading edge or top edge of the copy substrate electronically so that proper registration, particularly front to back registration in a duplex print mode, can be realized.

Figure 1:
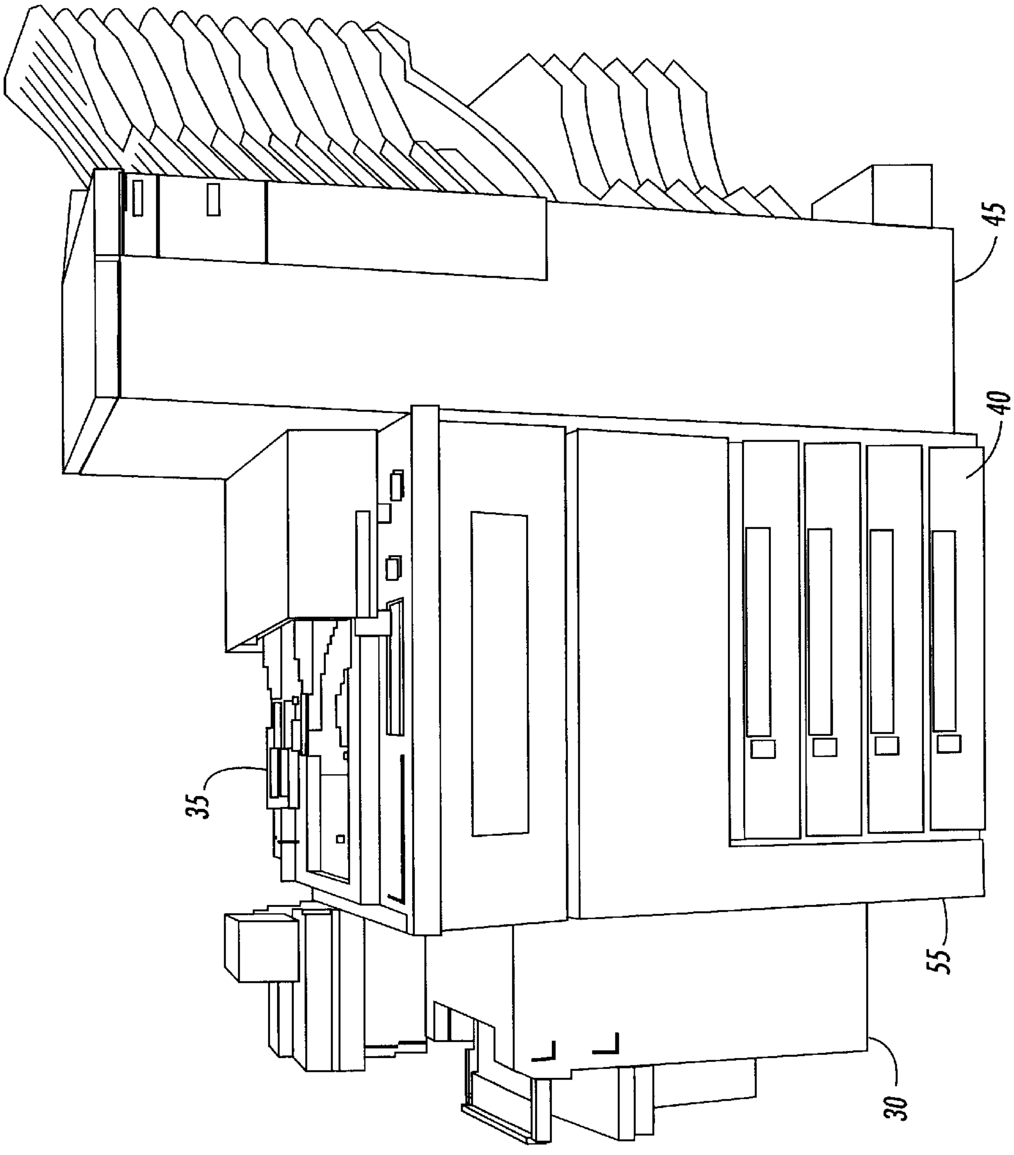
FIG. 1 illustrates an overall construction of a digital multi-function machine.
Figure 2:
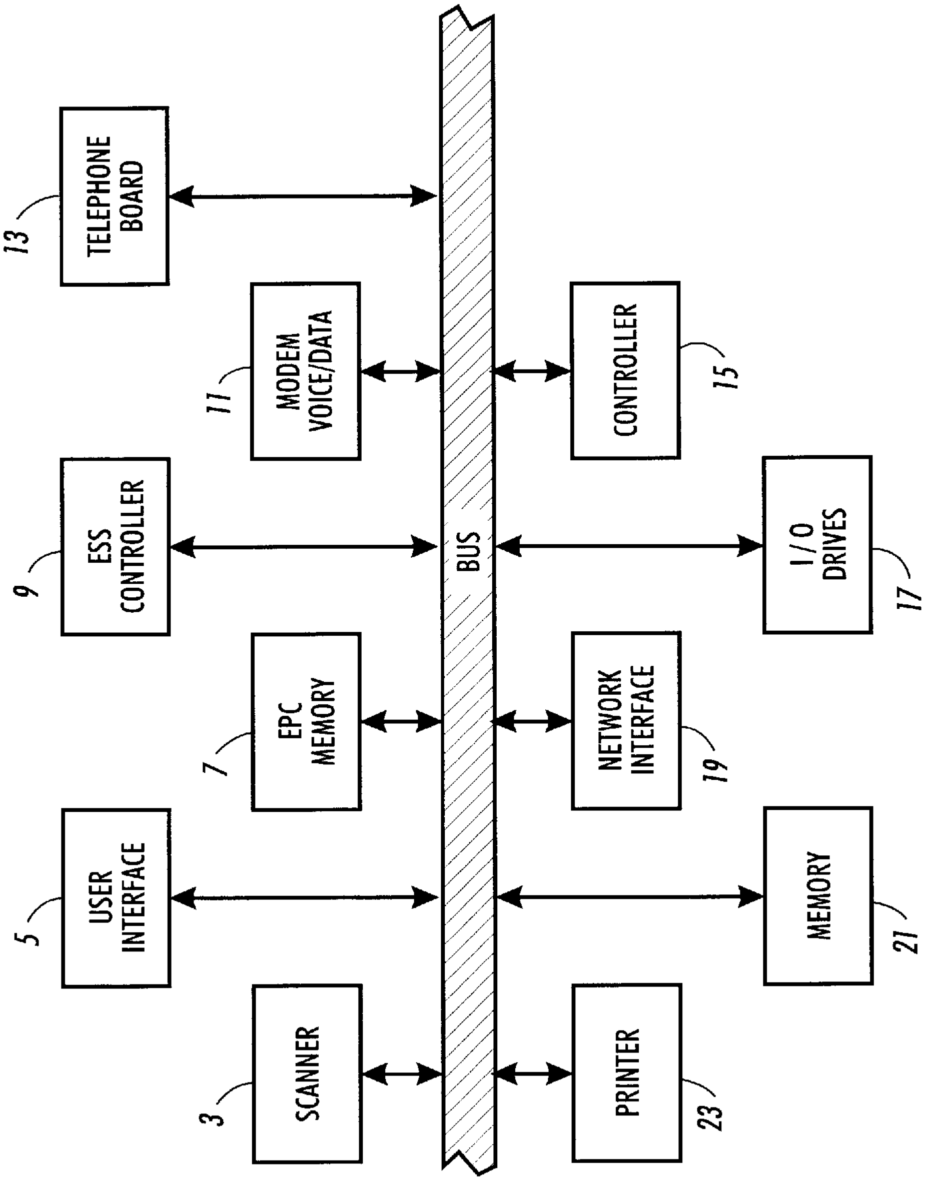
FIG. 2 (Conventional Art)
FIG. 2 illustrates a basic architecture of a digital multi-function machine.
Figure 3:
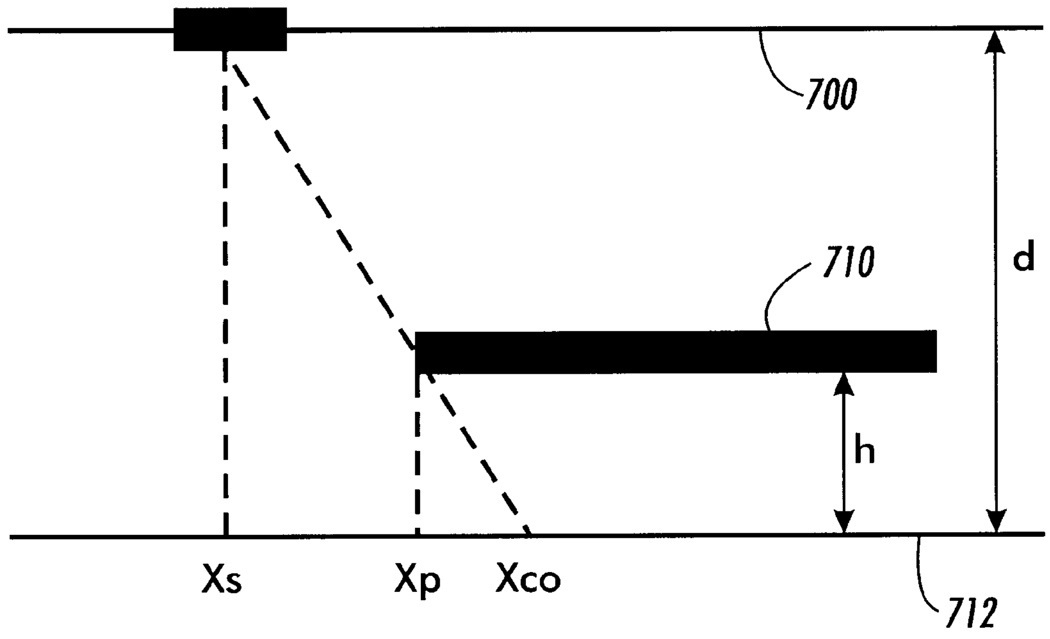
FIG. 3 illustrates an edge detection system according to the concepts of the present invention.

An example of this feature is illustrated in FIG. 3. As shown in FIG. 3, an edge locating system includes a linear light source 700 of periodically spaced light sources, such as LEDs (light-emitting diodes). One such periodically spaced source or LED is illustrated as element 701. The LEDs are used to illuminate a linear sensor array 712 to locate the edge position of a sheet of a copy substrate 710 intersecting the illumination on the sensor array. The actual location of these two devices is along a copy substrate path between a copy substrate tray and a image transfer station in the printing system, preferably the devices are as close to the transfer station as is feasible so that the effects on determination are minimized.

To determine the copy substrate's edge electronically, the present invention measures the location of the shadow formed by the copy substrate 710 intersecting the optical path (light) between the linear light source array 700 and the linear sensor array 712. The light intensities measured by the linear sensor array are converted to electrical signals which are fed into a controller or other processing device which performs the calculations described below to determine the copy substrate's edge electronically.

This information is then used by the printing system so as to properly register the image to the copy substrate. To better understand the edge location process, a brief description of the measurements and calculations used by three different processes will be given below.

In the following description, the x-values refer to the position along the linear sensor array 712, which can be measured in units of length or in pixel increments (typically 0.050 inches) from a pre-established absolute reference. To determine the edge of the copy substrate to be printed on, the following parameters are utilized:

$x_s$—location of the center of the LED segment (projected to the sensor plane);

$x_p$—location of the copy substrate edge;

$x_{co}$—location of the illumination "cut-off" point, i.e., edge of the shadow;

d—LED-to-sensor separation; and h—copy substrate height above sensor.

In the first process a single LED from the linear light source 700, nearest the expected copy substrate position, is illuminated. As illustrated in FIG. 3, a measurement of the shadow location, $x_{co}$, is performed by the linear sensor array

712 and an estimate for the copy substrate edge, $X_p'$, is computed by a control unit or processor, capable of performing digital calculations, connected to the linear sensor array. The following is a more detailed explanation of this measurement and calculation.

As stated above, the LED segment at $x_s$, which is determined to be nearest to the expected copy substrate edge location, is illuminated. Thereafter, the shadow position, $x_{co}$, is measured by the linear sensor array 712. The shadow is produced by the copy substrate edge when the copy substrate intersects the light path between the LED of the linear light source 700 and the linear sensor array. From this measurement and using the nominal height of the copy substrate above the linear sensor array 712, $h_n$, and the source-to-sensor separation, d, the estimate for the copy substrate's edge, $x_p'$, is calculated using the following equation:

$$x'_p = x_{co} + (x_s - x_{co})\frac{h_n}{d}$$

In this first process, error results from the copy substrate height deviating by an unknown amount, Δh, from the nominal height, $h_n$, which has been assumed in the correction for parallax. This simple approach is useful only if the fractional copy substrate height change, Δh, can be kept very small.

In a second process, two different LED segments, (not shown) $x_{s1}$ and $x_{s2}$, are illuminated sequentially, and the corresponding shadow positions, (not shown) $x_{co1}$ and $x_{co2}$, are measured. The parallax correction equations can be solved simultaneously to provide an estimate of copy substrate position, $x_p'$, independent of the initial copy substrate height, h. While the initial copy substrate height, h, is not required to be known for this approach, the computation will be error free only if there is no change in the copy substrate height, Δh, between sequential measurements. The specific steps are as follows.

Based on the expected copy substrate position, two LED segments of the linear light source 700 are illuminated, preferably on the opposite sides of the expected copy substrate edge position, at $x_{s1}$ and $x_{s2}$. More specifically, the LED segment at $x_{s1}$ is illuminated, and the corresponding shadow location, $x_{co1}$, is measured by the linear sensor array 712. Thereafter, the LED at $x_{s1}$ is extinguished, and the LED segment at $x_{s2}$ is illuminated so that the corresponding shadow location, $x_{co2}$, can be measured by the linear sensor array 712. Next, the estimate of copy substrate edge location, $x_p'$, is calculated by a control unit using the two LED segment positions and the two measured shadow positions. The following is the equation used to calculate the estimated position:

$$x'_p = \frac{x_{s2}x_{co1} - x_{s1}x_{co2}}{(x_{co1} - x_{s1}) - (x_{co2} - x_{s2})}.$$

The above estimate will be error free if there is no copy substrate height change between measurements.

The third process is an iterative application of the first described process in which a first estimate of copy substrate position is used to select a new LED segment, having reduced parallax error, for a second estimate of copy substrate position. The process can be repeated, using the second estimate to select a third LED position, etc., The iteration is only limited by the precision of discrete LED segment locations on the linear light source. The specific steps are listed below.

An LED segment of the linear light source 700 at $X_{s1}$ nearest the expected copy substrate edge position is illuminated, and the corresponding edge shadow location, $x_{co1}$, is measured by the linear sensor array 712. The measured shadow position, $x_{co1}$, is used to compute a first estimate of copy substrate position, $x_{p1}'$, according to the following:

$$x'_{p1} = x_{co1} + (x_{s1} - x_{co1})\frac{h_n}{d}$$

where $h_n$ is the assumed nominal copy substrate height.

Next the control unit determines the position of the LED segment nearest the above estimate using $x_{s2}=x_{s1}+p_{LED}\,\mathrm{INT}(((x_{p1}'-x_{s1})/p_{LED})+0.5)$ where $p_{LED}$ is the center-to-center "pitch" of the LED segments, and the "INT" function can be any convenient function to determine the nearest integer number of LED segments between the first copy substrate position estimate, $x_{p1}'$, and first LED position, $x_{s1}$. Upon determining the next LED segment, $x_{s2}$, the LED segment at $x_{s2}$ is illuminated, and the shadow location, $x_{co2}$, is measured by the linear sensor array 712. From this second measurement, a new estimate of copy substrate edge location, $x_{p2}'$, is computed by a processor using:

$$x'_{p2} = x_{co2} + (x_{s2} - x_{co2})\frac{h_n}{d}.$$

If the error in the first iteration exceeds the LED pitch, $p_{LED}$, it is probable that an additional iteration will improve accuracy. If the error from the first measurement is sufficiently small, i.e., $(x_{p1}'-x_{s1})<0.5\ p_{LED}$, the second measurement can be eliminated.

Moreover, the second and third processes described above can also be made adaptive wherein information from the first copy substrate edge computation is used to select the LED to be used in the second measurement. This permits selection of a second LED closer to the actual copy substrate edge, producing a higher signal/noise ratio and reducing the probability that the second measurement will be attempted with an LED having insufficient range. The "cut-off" or shadow values from the two sequential measurements may be used to compute the actual copy substrate edge location. The following will be a description of the adaptive processes.

The adaptive processes described below are variants of the second and third processes described above. In these adaptive processes, two LED segments at $x_{s1}$ and $x_{s2}$ are sequentially illuminated, but information from the LED at $x_{s1}$ is used to select the second LED position by one of two methods. The specific steps are as follows.

A first LED at $x_{s1}$ is selected as the nearest element to the expected copy substrate edge location. It is essential that the full range of copy substrate locations be within the range of this first LED. Next, the shadow position, $x_{co1}$, produced by the copy substrate edge is recorded. The second LED location is chosen by one of the following two methods.

Method 1 selects the second LED to be a fixed number of elements, N, in the same direction as the copy substrate edge from the first LED; i.e., $x_{s2}=x_{s1}+N\ p_{LED}$, for $x_{co1}\geqq x_{s1}$, or $x_{s2}=x_{s1}-N\ p_{LED}$, for $x_{co1}<x_{s1}$, where N is a positive (non-zero) integer, typically in the range of 1 to 4, and $P_{LED}$ is the LED element-to-element pitch. This assures the second LED will be on the same side of the nominal position as the copy substrate edge and provide improved measurement signal/noise ratio in the vicinity of the shadow position.

Alternatively, method 2 estimates the distance of the copy substrate edge from $x_{s1}$ and selects the position of the LED closest to the copy substrate edge for the second measurement. The distance between the estimated copy substrate edge location and first LED position, $x_{p1}'-x_{s1}$, can be found from the first measurement. Dividing this distance by the LED pitch and rounding to the nearest integer provides a best estimate of where the second LED should be selected. The location of the second LED should thus be computed from $X_{s2}=X_{s1}+p_{LED}$ INT as in process 2 above, or from the mathematically equivalent form, $$xs2 = x_{s1} + p_{LED} INT\left(\left(\left(\left((x_{CO1}-x_{s1})\left(1-\left(\frac{x'_{p1}-x_{s1}}{p_{LED}}+0.5\right)(h/d)\right)\right)\right)/p_{LED}\right)+0.5\right)$$

where the nominal values of h and d can be used. The INT function is any function providing the integer part to the fraction in its argument. If the INT function produces zero (i.e., the copy substrate edge is within 0.5 pLED of $x_{s1}$), $x_{s2}$ must be selected by an alternate method. One approach is to use first method described above, with N=1 or 2. Another is to compute $x_p$ directly from the first measurement and ignore the second measurement.

Once the second LED segment has been determined from one of the methods described above, the second LED segment, $x_{s2}$, is illuminated, and the shadow position, $x_{co2}$, is recorded. Thereafter, an estimate, $x_p'$, of the copy substrate edge location is computed by a processor or control unit using the two source positions, $x_{s1}$, $x_{s2}$, and the two shadow positions, $x_{co1}$, $x_{co2}$, as:

$$x'_p = \frac{x_{s2}x_{co1} - x_{s1}x_{co2}}{(x_{co1}-x_{s1})-(x_{co2}-x_{s2})}.$$

The above estimate will have an error caused by copy substrate height movement between measurements of $$\varepsilon = x_p - x'_p = -\frac{(x_{co1}-x_{s1})(x_{co2}-x_{s2})}{(x_{co1}-x_{s1})-(x_{co2}-x_{s2})}\frac{\Delta h}{d}$$

Assuming the following values, the adaptive approaches described above produce the error results as shown in FIG. 4:

$x_{s1}$=10.0 mm (expected copy substrate location and center of first LED), h=4.7 mm (height of copy substrate above sensor), Δh=1.5 mm (change in sensor-to-copy substrate height between measurements), and $p_{LED}$=2.54 mm (LED array pitch).

Figure 4:
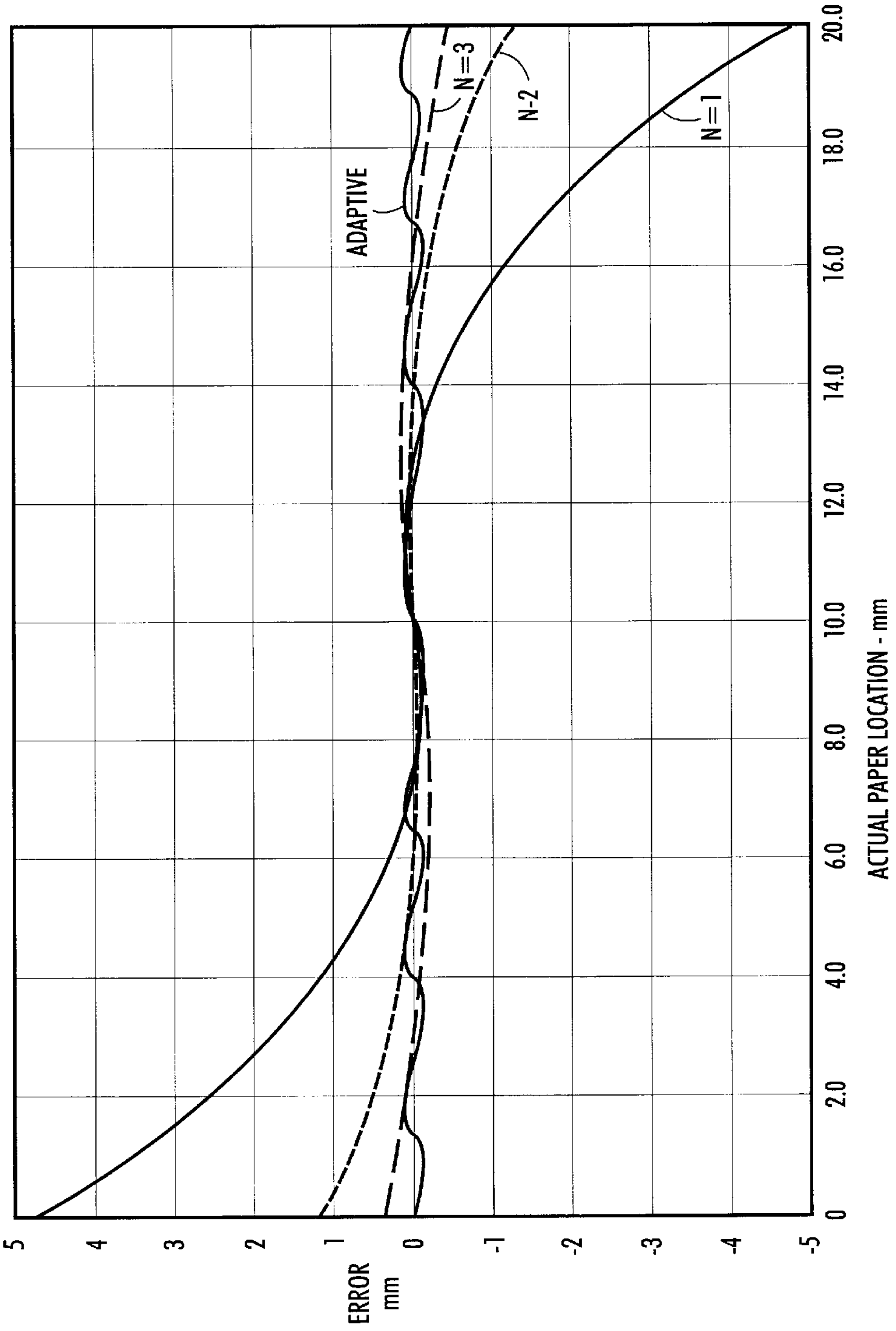
FIG. 4 is a graphical representation of the error results using the adaptive detection methods according to the concepts of the present invention.

FIG. 4 shows the error in computed copy substrate edge location as a function of the actual copy substrate edge location. Results for (method 1) fixed ΔN's of 1, 2 and 3 are shown, along with the (method 2) "adaptive ΔN" case. In the adaptive ΔN case, the algorithm reverts to a fixed ΔN=±2 when the adaptive algorithm predicts a second LED position the same as the first.

The results suggest that either the adaptive ΔN algorithm or the ΔN=±2 algorithm is preferable. Note that, although smaller errors occur for fixed ΔN>2, copy substrate edges near the expected position (10 mm in FIG. 4) will be illuminated by LED segments more than 2 LED pitches from the edge during the second measurement. This will likely be out of range for the second measurement.

To ensure accurate calculations in any of the above described processes, the system must be calibrated spatially between the linear light source and the linear sensor array. This requirement for a spatial calibration between the LEDs and sensor arrays, in the preferred embodiment, occurs because parallax correction in the copy substrate edge calculation requires a knowledge of both the shadow location on the sensor and the source location causing the shadow. These locations must be expressed on a common axis, preferably the sensor axis where both can be measured in terms of pixels from a common origin. Ideally, the separate assemblies holding the two arrays can be designed to permit reliable mechanical alignment with no adjustments subsequent to assembly, so that the position of any LED source element is known in sensor coordinates to <1.0 mm error.

If this is not practical, one can locate a known LED segment from measurement of its profile on the sensor array. For example, if the light profile limits of an LED are measured at four different thresholds, the average of these limits can be used to compute the profile peak, thus the LED center location. This method depends on the symmetry of the LED illumination profile and the photoresponse non-uniformity of the sensor array.

Figure 5:
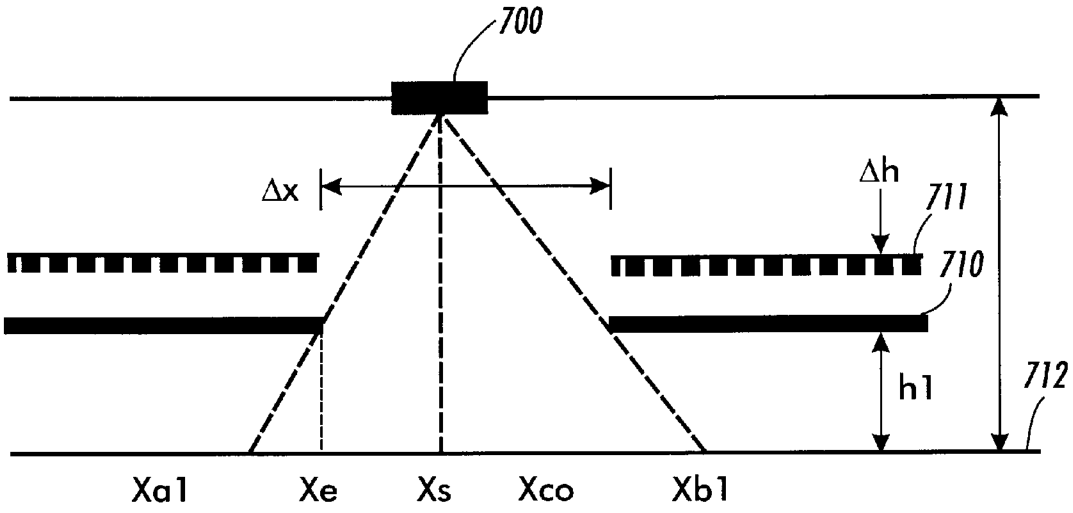
FIG. 5 illustrates a calibration method according to the concepts of the present invention.

If the above methods are not sufficiently accurate, a third method using a calibration tool, as shown in FIG. 5, can be used to locate the source portion on the sensor axis. The tool is presumed to have a slot of width, Δx, (or two slits separated by Δx) positioned near an LED segment whose position is to be determined. Determination of the location of one LED segment plus prior knowledge of the LED array element-to-element periodic spacing is sufficient to locate all elements of the source array. The slot edges (or slits) obviously must both be simultaneously within the illumination range of the LED segment.

This third calibration method requires two separate shadow measurements, each at a different height of the slot. It is noted that two measurements with slot displacement parallel to the sensor axis will not produce the equivalent result, the displacement must have a component normal to the sensor axis.

The assumed component positions are shown in FIG. 5. The left edge, $x_e$, and its shadow, $x_{a1}$, are related to the source position, $x_s$, the height of the edge, $h_1$, and the sensor-to-LED distance, d, by $((x_e-x_{a1})/(x_s-x_{a1}))=h_1/d$. From this relationship, $x_e=x_{a1}(1-(h_1/d))+(h_1*x_s)/d$. Similarly, the edge (or slit) at $x_e+\Delta x$, with a shadow at $x_{b1}$ gives $x_e+\Delta x=x_{b1}(1-(h_1/d))+(h_1*x_s)/d$ Subtracting the previous two equations gives a third useful relationship for the h/d ratio, $(h_1/d)=1-(\Delta x/(x_{b1}x_{a1}))$. If the alignment tool 800 is moved to a new height, $h_2=h_1+\Delta h$, above the sensor array, maintaining the same edge coordinate, a second set of shadows, $x_{a2}$, $x_{b2}$ will occur on the sensor. Three similar equations are generated at the new height: $x_e=x_{a2}(1-(h_2/d))+(h_2*x_s)/d$; $x_e+\Delta x=x_{b2}(1-(h_2/d))+(h_2*x_s)/d$; and $(h_2/d)=1-(\Delta x/(x_{b2}-x_{a2}))$.

The above equations can be solved simultaneously, eliminating $x_e$ and the two h/d ratios, giving $$x_s = \frac{x_{a1}(x_{b2}-x_{a2})-x_{a2}(x_{b1}-x_{a1})}{(x_{b2}-x_{a2})-(x_{b1}-x_{a1})}$$

The location of the source center on the sensor axis can thus be determined from the four shadow measurements, two at each height.

It may also be useful to locate some feature on the sensor array to an external machine feature such as the duplex paper transport mechanism If the calibration tool 800 locates the edge of the slot by a known distance to some external duplex transport feature, solving the above equations for the edge location, $x_e$, permits that known distance to be located precisely on the sensor axis.

Thus, using the solved value for $x_s$, the edge location in sensor coordinates is $$x_c = x_s + \frac{\Delta x}{x_{bl} - x_{al}}(x_{al} - x_s).$$

Several mechanical approaches can be used to construct a calibration tool 800 to achieve the above conditions. A tool consisting of an elongated flat member, containing a slot of known width, can be inserted between the LED and sensor arrays after attachment of the arrays to the duplex paper transport. The slot width should be well within the illumination range of one LED. The tool can be directly elevated to a new height to produce the second two shadows, or it can be removed and reinserted at a new height. It is only required that the edge location, $x_e$, be precisely maintained.

It is also possible to use a single calibration tool with two slots at different heights. The slots are separated in the x-direction so that each falls under a different LED. If the slots are separated by $\Delta x_e$ (e.g., left edge-to-left edge) and the LEDs are separated by $\Delta x_s$, and both separation distances are predetermined, the equations for the second set of measurements may be modified by replacing $x_e$ with $x_e+\Delta x_e$ and $x_s$ with $x_s+\Delta x_s$. The simultaneous solution for the two sets of equations will then produce similar results for $x_s$ and $x_e$, except there will be correction terms involving the selected $\Delta x_s$ and $\Delta x_e$. Arbitrarily choosing $\Delta x_s=x_e$ will significantly simplify the correction terms.

Figure 6:
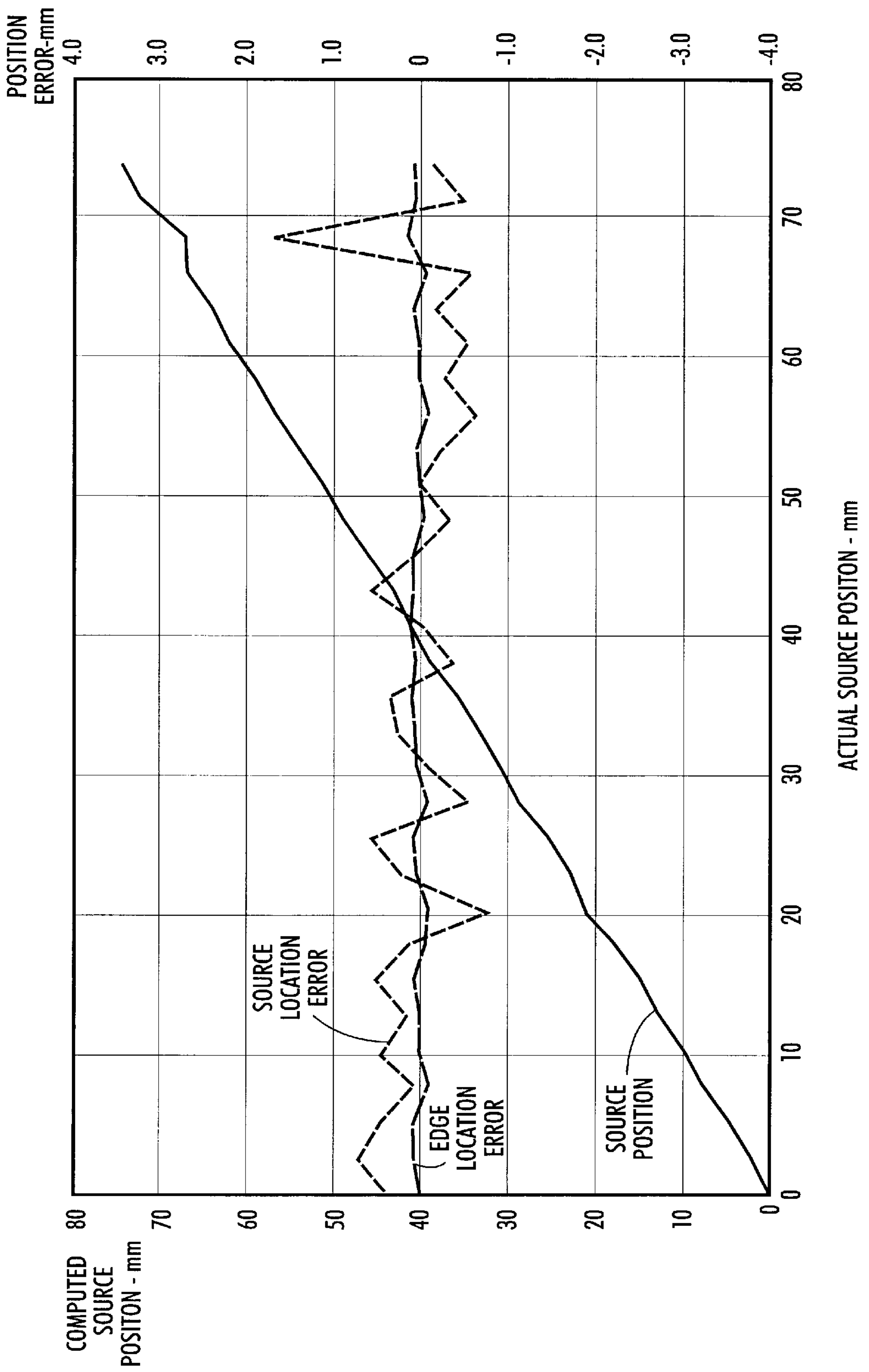
FIG. 6 shows the computed source location vs. the actual source location error results for the calibration method.

The precision with which $x_s$ can be computed is limited primarily by the precision of the shadow measurements on the sensor. The discrete sensor locations will introduce some error, dependent on the choice of Δx, Δh, etc. A sample result is shown in FIG. 6 for reasonable values of tool parameters: i.e., $h_1$=2.0 mm (height of first measurement), $h_2$=6.0 mm (height of second measurement)

Δx=9.0 mm (slot width)

d=25.0 mm (sensor-to-LED distance), and $x_e$=30.0 mm (location of slot edge in sensor coordinates, initially unknown).

The LED pitch is assumed to be 2.54 mm (0.1 inch) and the sensor pitch 0.127 mm (1/200 inch) in this example. The plot of FIG. 6 shows the computed source location vs. the actual source location. Note that for sources near the edge of the slot ($x_s$~30 mm) the precision for $x_s$ is ±0.5 num The corresponding edge position, $x_e$, is computed with a precision better than ±0.1 mm.

In summary, the present invention is a system or process to electronically find a copy substrate's edge through the measurement of one or more shadows generated from the intersection of the copy substrate with a light path between a linear light source array and a linear sensor array. The present invention also utilizes a calibration tool and method to calibrate the location of the individual light sources in the linear light source array with respect to the individual sensor sites in the linear sensor array.

Although the present invention has been described in detail above, various modifications can be implemented without departing from the spirit of the present invention. For example, the preferred embodiment of the present invention has been described with respect to a generic printing system; however, these methods are readily implemented in an analog or "light-lens" copy system or a digital printing or copying system.

Moreover, the electronic edge determination system of the present invention can be readily implemented on a general purpose computer, a personal computer or workstation. The electronic edge determination system of the present invention can also be readily implanted on an ASIC or be readily implemented in software.

Lastly, while the present invention has been described with respect to an array of LEDs as the linear light source, the present invention can be readily implemented with any linear light source that can be segmented, and the illumination can be individually controlled.

While the invention has been described with reference to various embodiments disclosed above, it is not confined to the details set forth above, but is intended to cover such modifications or changes as may come within the scope of the attached claims.

What is claimed is:

1. A method for electronically determining an edge of a copy substrate to be printed on, comprising the steps of:

(a) inserting a copy substrate between a linear light source array and a linear sensor array;

(b) illuminating a light segment of the linear light source;

(c) measuring an edge location of a shadow created by the copy substrate intersecting a light path between the illuminated light segment and the linear sensor array; and (d) calculating a location of the edge of the copy substrate based on the measured shadow location;

said step (d) calculating a location of the edge of the copy substrate based on the shadow location measured at said step (c) and the location of the light segment illuminated at said step (b);

said step (d) calculating a location of the edge of the copy substrate, $x_p'$, using the formula $$x_p' = x_{co} + (x_s - x_{co})(h_n/d)$$

where $x_{co}$ is the location of the measured shadow, $x_s$ is the location of the illuminated light segment, $h_n$ is a distance between the copy substrate and the linear sensor array, and d is a distance between the linear light source and the linear sensor array.

2. A method for electronically determining an edge of a copy substrate to be printed on, comprising the steps of:

(a) inserting a copy substrate between a linear light source array and a linear sensor array;

(b) illuminating a light segment of the linear light source;

(c) measuring an edge location of a shadow created by the copy substrate intersecting a light path between the illuminated light segment and the linear sensor array;

(d) calculating a location of the edge of the copy substrate based on the measured shadow location;

(e) illuminating a second light segment of the linear light source array near the expected copy substrate edge position; and (f) measuring a second edge location of a shadow created by the copy substrate intersecting a light path between the illuminated second light segment and the linear sensor array;

said step (d) calculating a location of the edge of the copy substrate based on the shadow location measured at said step (c), the shadow location measured at said step (f), the location of the light segment illuminated at said step (b), and the location of the light segment illuminated at said step (e);

said step (d) calculating a location of the edge of the copy substrate, $x_p'$, using the formula $$x_p' = (x_{s2}x_{co1} - x_{s1}x_{co2}) / ((x_{co1} - x_{s1}) - (x_{co2} - x_{s2}))$$

where $x_{co1}$ is the location of the shadow measured at said step (c), $x_{co2}$ is the location of the shadow measured at said step (f), $x_{s1}$ is the location of the light segment illuminated at said step (b), and $x_{s2}$ is the location of the light segment illuminated at said step (e).

3. A method for electronically determining an edge of a copy substrate to be printed on, comprising the steps of:

(a) inserting a copy substrate between a linear light source array and a linear sensor array;

(b) illuminating a light segment of the linear light source;

(c) measuring an edge location of a shadow created by the copy substrate intersecting a light path between the illuminated light segment and the linear sensor array;

(d) calculating a location of the edge of the copy substrate based on the measured shadow location;

(e) determining a light segment of the linear light source which corresponds to the location calculated in said step (d);

(f) illuminating the light segment of the linear light source determined in said step (e);

(g) measuring an edge location of a shadow created by the copy substrate intersecting a light path between the illuminated light segment of said step (f) and the linear sensor array; and (h) calculating a location of the edge of the copy substrate based on the measured shadow location at said step (g);

said step (h) calculating a location of the edge of the copy substrate based on the shadow location measured at said step (g) and the location of the light segment illuminated at said step (f);

said step (h) calculating a location of the edge of the copy substrate, $x_p'$, using the formula $$x_p' = x_{co2} + (x_{s2} - x_{co2})(h_n/d)$$

where $x_{co2}$ is the location of the measured shadow at said step (g), $x_{s2}$ is the location of the illuminated light segment at said step (f), $h_n$ is a distance between the copy substrate and the linear sensor array, and d is a distance between the linear light source and the linear sensor array.

* * * * *